United States Patent
Jeon

(10) Patent No.: US 9,834,186 B2
(45) Date of Patent: Dec. 5, 2017

(54) AUTONOMOUS EMERGENCY BRAKING APPARATUS AND METHOD

(71) Applicant: HYUNDAI MOTOR COMPANY, Seoul (KR)

(72) Inventor: Dae Seok Jeon, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/178,019

(22) Filed: Jun. 9, 2016

(65) Prior Publication Data

US 2017/0113668 A1    Apr. 27, 2017

(30) Foreign Application Priority Data

Oct. 21, 2015 (KR) .......................... 10-2015-0146884

(51) Int. Cl.
   *B60T 7/22* (2006.01)

(52) U.S. Cl.
   CPC ............ *B60T 7/22* (2013.01); *B60T 2201/022* (2013.01)

(58) Field of Classification Search
   CPC ...... B60T 7/22; B60T 8/171; B60T 2201/022; B60T 7/12; B60T 2201/024; B60T 8/17558
   See application file for complete search history.

(56) References Cited

U.S. PATENT DOCUMENTS

| | | | |
|---|---|---|---|
| 5,646,612 A | 7/1997 | Byon | |
| 7,085,637 B2 * | 8/2006 | Breed | B60N 2/2863 340/440 |
| 8,751,142 B2 | 6/2014 | Kim | |
| 2004/0090117 A1 * | 5/2004 | Dudeck | B60T 7/22 303/191 |
| 2009/0038873 A1 * | 2/2009 | Lucas | B60R 21/0134 180/275 |
| 2009/0192710 A1 * | 7/2009 | Eidehall | B62D 15/0265 701/301 |
| 2010/0006363 A1 * | 1/2010 | Zagorski | B60T 7/22 180/275 |
| 2010/0030474 A1 | 2/2010 | Sawada | |
| 2012/0116663 A1 * | 5/2012 | Tsunekawa | G08G 1/166 701/300 |
| 2012/0130629 A1 | 5/2012 | Kim | |

(Continued)

FOREIGN PATENT DOCUMENTS

| | | |
|---|---|---|
| JP | 2829267 B2 | 11/1998 |
| JP | 2010-030513 A | 2/2010 |

(Continued)

*Primary Examiner* — McDieunel Marc
(74) *Attorney, Agent, or Firm* — McDermott Will & Emery LLP

(57) ABSTRACT

An autonomous emergency braking apparatus comprises: a relative vehicle information collector that collects relative vehicle information regarding a relative vehicle using a plurality of sensors in a vehicle; a self vehicle information collector that collects self vehicle information regarding a self vehicle using the plurality of sensors; and a processor configured to calculate and compare a first time for a collision avoidance of the self vehicle and a second time for a collision avoidance of the relative vehicle based on the relative vehicle information and the self vehicle information, and determine a braking point of time and a required braking force based on the comparison of the first time and the second time.

10 Claims, 8 Drawing Sheets

(56) References Cited

U.S. PATENT DOCUMENTS

2012/0265418 A1\* 10/2012 Foerster .................. B60T 7/22
          701/70
2014/0195141 A1    7/2014 Nagata
2016/0121887 A1    5/2016 Jeon

FOREIGN PATENT DOCUMENTS

| JP | 2011-018165 A   | 1/2011  |
|----|-----------------|---------|
| JP | 2011-108209 A   | 6/2011  |
| JP | 4824511 B2      | 11/2011 |
| JP | 5166975 B2      | 3/2013  |
| JP | 2014-149741 A   | 8/2014  |
| KR | 10-0954232 B1   | 4/2010  |
| KR | 10-1029096 B1   | 4/2011  |
| KR | 10-1113527 B1   | 2/2012  |
| KR | 10-2014-0091341 A | 7/2014 |

\* cited by examiner

AUTONOMOUS EMERGENCY BRAKING APPARATUS AND METHOD

CROSS-REFERENCE TO RELATED APPLICATION

This application is claims the benefit of priority to Korean Patent Application No. 10-2015-0146884, filed on Oct. 21, 2015 with the Korean Intellectual Property Office, the entirety of which is incorporated herein by reference.

TECHNICAL FIELD

The present disclosure relates to an autonomous emergency braking apparatus and method, and more particularly, to an autonomous emergency braking apparatus and method for estimating a collision point of time with another vehicle having a different advancing direction from the self vehicle to control a braking of the self vehicle.

BACKGROUND

An autonomous emergency braking (AEB) apparatus is a safety system operated when a nearby vehicle reduces a velocity thereof or stops, or when an obstacle such as a pedestrian or the like abruptly appears. The autonomous emergency braking (AEB) apparatus provides a warning for a collision risk with the nearby vehicle to a driver or operates a brake, thereby allowing the driver to avoid the collision with the nearby vehicle.

A conventional autonomous emergency braking apparatus described above performs an emergency braking only when the collision risk with the nearby vehicle which is being driven in the same lane is detected. Therefore, according to the related art, the collision with the nearby vehicle (a forward vehicle) may be avoided, but the collision risk with a vehicle that is moving in a different direction from the self vehicle may not be avoided.

SUMMARY

The present disclosure has been made to solve the above-mentioned problems occurring in the prior art while maintaining the advantages achieved by the prior art intact.

An aspect of the present disclosure provides an autonomous emergency braking apparatus and method for estimating a collision point of time with another vehicle having a different advancing direction from that of the self vehicle to control a braking of the self vehicle.

According to an exemplary embodiment of the present disclosure, an autonomous emergency braking apparatus comprises: a relative vehicle information collector that collects relative vehicle information regarding a relative vehicle using a plurality of sensors in a vehicle; a self vehicle information collector that collects self vehicle information regarding a self vehicle using the plurality of sensors; and a processor configured to calculate and compare a first time for a collision avoidance of the self vehicle and a second time for a collision avoidance of the relative vehicle based on the relative vehicle information and the self vehicle information, and determine a braking point of time and a required braking force based on the comparison of the first time and the second time.

The relative vehicle information may include longitudinal velocity and lateral velocity of the relative vehicle, an advancing direction of the relative vehicle, a relative location of the relative vehicle, and a width and a length of the relative vehicle.

The self vehicle information may include velocity of the self vehicle, an advancing direction of the self vehicle, and a width and a length of the self vehicle.

The processor may calculate a collision location, a collision angle, and a time to collision based on the relative vehicle information and the self vehicle information.

The first time may be a time taken until a relative velocity of the relative vehicle or a velocity of the self vehicle becomes 0 kph.

The second time may be a time necessary for the relative vehicle to avoid a collision with the self vehicle.

When the second time is the first time or more, the processor may perform a full braking.

When the second time is less than the first time, the processor may perform a partial braking.

The processor may assist in the braking so that the full braking is performed when a braking is performed by a user at the time of the partial braking.

According to another exemplary embodiment of the present disclosure, an autonomous emergency braking method comprising steps of: collecting relative vehicle information regarding a relative vehicle; collecting self vehicle information regarding information of a self vehicle; calculating collision estimation information based on the relative vehicle information and the self vehicle information; calculating a first time for a collision avoidance of the self vehicle and a second time for a collision avoidance of the relative vehicle based on the collision estimation information; comparing the first time and the second time; and determining a braking point of time and a required braking force based on the comparison of the first time and the second time.

In the step of determining the braking point of time and the required braking force, a brake may be controlled to perform a full braking when the second time is greater than or equal to the first time.

In the step of determining the braking point of time and the required braking force, a brake may be controlled to perform a partial braking when the second time is less than the first time.

In the step of determining the braking point of time and the required braking force, a braking assistance may be performed so that the full braking is implemented when a braking is performed by a user while the partial braking is performed.

The braking point of time may be half of the first time.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Throughout the present specification, the terms "comprising", "configuring", "having", and the like are understood to mean that the corresponding element may be embedded unless explicitly described to the contrary in the present specification. That is, such terms allow for the inclusion of other elements rather than the exclusion of any other elements.

In addition, the terms "-er", "-or", "module", and the like described in the present specification mean units for processing at least one function or operation, and can be implemented by hardware, software, or combinations thereof. In addition, articles such as "a", "an", "the", and the like may be used to include both singular forms and plural forms unless the context clearly indicates otherwise, in the context describing the present disclosure.

Hereinafter, exemplary embodiments of the present disclosure will be described in detail with reference to the accompanying drawings.

According to the present disclosure, since a collision point of time with another vehicle which is being driven in an advancing direction different from that of a self vehicle at an intersection is estimated to control a braking of the vehicle, a collision with the other vehicle may be avoided.

Figure 1:
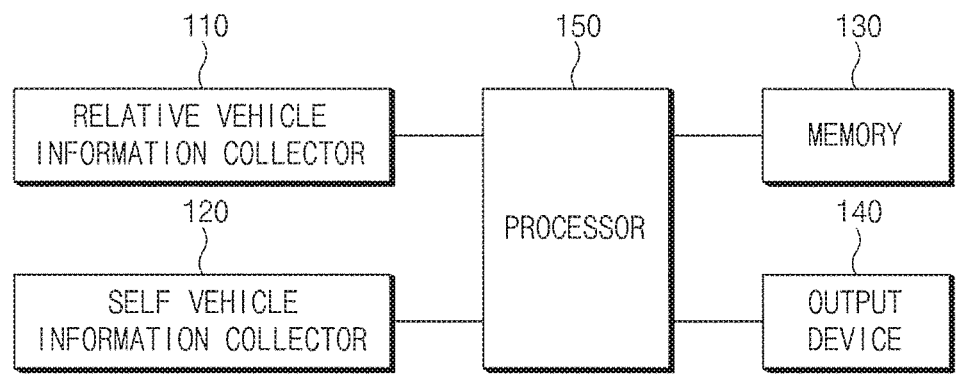
FIG. 1 is a block diagram of an autonomous emergency braking apparatus according to an exemplary embodiment in the present disclosure.
Figure 2:
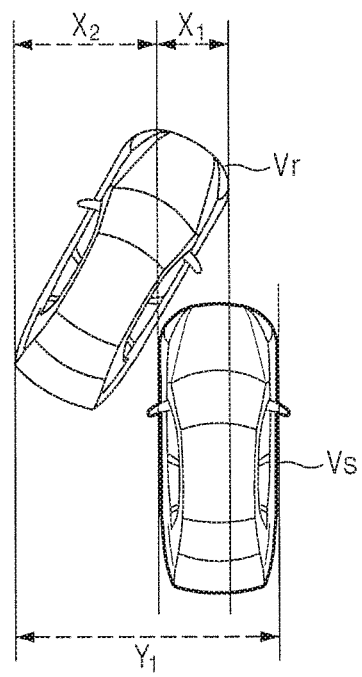
FIG. 2 is a diagram illustrating Equation 2 related to the present disclosure.

FIG. 1 is a block diagram of an autonomous emergency braking apparatus according to an exemplary embodiment in the present disclosure and FIG. 2 is a diagram illustrating Equation 2 as it relates to the present disclosure.

As illustrated in FIG. 1, an autonomous emergency braking apparatus includes a relative vehicle information collector 110, a self vehicle information collector 120, a memory 130, an output device 140, and a processor 150. The respective components configuring the autonomous emergency braking apparatus are connected to each other via a vehicle network. Here, the vehicle network may be implemented by one or more technologies of a controller area network (CAN), a media oriented systems transport (MOST) network, a local interconnect network (LIN), and Flexray.

The relative vehicle information collector 110 collects relative vehicle information using sensors (not illustrated) mounted in the vehicle. The relative vehicle information includes a velocity and an advancing direction of the relative vehicle, a relative vehicle location, a size (a width and a length) of the relative vehicle, and the like.

In other words, the relative vehicle information collector 110 calculates the velocity and advancing direction of the relative vehicle, and the relative vehicle location based on data measured using an omnidirectional sensor, an image sensor, a distance sensor (e.g., an ultrasonic sensor and/or radar, etc.). The velocity of the relative vehicle includes longitudinal velocity and lateral velocity of the relative vehicle.

The self vehicle information collector 120 collects self vehicle information such as a velocity, an advancing direction, and the like of the self vehicle using sensors (not illustrated) such as a velocity sensor, a gyro sensor, a steering angle sensor, and the like mounted in the vehicle.

The memory 130 stores general information of the vehicle such as a width and a length of the vehicle, an identification number of the vehicle, and the like, the relative vehicle information, and the self vehicle information. The memory 130 stores a variety of data generated when the autonomous emergency braking apparatus is operated.

The memory 130 may be implemented as any one of storage media such as a flash memory, a hard disk, a random access memory (RAM), a static random access memory (SRAM), a read only memory (ROM), and an electrically erasable programmable read-only memory (EEPROM).

The output device 140 outputs whether or not there is a collision risk, whether or not a collision may be avoided, and the like in an audiovisual form which is recognizable by a driver. The output device 140 may be implemented as a display device, an audio device (e.g., a speaker), or the like. The display device may be implemented as one or more of a liquid crystal display (LCD), a thin film transistor-liquid crystal display (TFT LCD), an organic light-emitting diode (OLED), a flexible display, a three-dimensional (3D) display, a transparent display, a head-up display (HUD), a touch screen, and a cluster.

In addition, the output device 140 may also include a haptic module (not illustrated) that outputs tactile information such as vibration.

The processor 150 calculates a collision location at which the collision with the relative vehicle is expected, a collision angle, a time to collision (TTC), and the like, based on the relative vehicle information and the self vehicle information. Here, since a method for calculating a collision location, a collision angle, a time to collision (TTC), and the like is disclosed in an earlier application (Korean Patent Application No. 10-2014-0152422) by the present applicant, a detailed description thereof will be omitted.

The processor 150 calculates a first time $t_1$ necessary to avoid a collision of the self vehicle and a second time $t_2$ necessary to avoid a collision of the relative vehicle, based on the collision location, the collision angle, and the time to collision. The first time $t_1$ is the time needed to alter the velocity of the self vehicle to make a relative velocity of the relative vehicle or a velocity of the self vehicle 0 kph (kilometer per hour). The second time $t_2$ is a time necessary to allow the relative vehicle (a target vehicle) to pass the self vehicle so as not to collide with the self vehicle.

If the relative velocity (the velocity of the relative vehicle—the velocity of the self vehicle) of the relative vehicle (the target vehicle) is a threshold value or more, the processor 150 calculates the time $t_1$ necessary to make the relative velocity of the relative vehicle 0 kph. If the relative velocity of the relative vehicle is less than the threshold value, the processor 150 calculates the time $t_1$ taken until the self vehicle stops (0 kph). Here, the threshold value is determined by considering error of the sensor.

The processor 150 calculates the first time $t_1$ using Equation 1.

$$t_1 = \frac{v_{rx}}{\mu g} \quad \text{[Equation 1]}$$

Here, $v_{rx}$ is the relative velocity between the velocity of the self vehicle in the advancing direction (an x axis) of the self vehicle and the velocity of the relative vehicle, $\mu$ is a friction coefficient of a road, and g is acceleration of gravity.

The processor 150 calculates the second time $t_2$ necessary for the relative vehicle to avoid the collision with the self vehicle. The second time $t_2$ may be expressed by the following Equation 2.

$$t_2 = TTC + \frac{Y_1}{v_{ry}}$$ [Equation 2]

Here, $v_{ry}$ is a relative velocity between the velocity of the self vehicle in the lateral direction of the self vehicle and the velocity of the relative vehicle, and $Y_1$ is a width of an area occupied by the self vehicle and the relative vehicle when the self vehicle and the relative vehicle collide with each other. $Y_1$ is calculated based on distances $X_1$ and $X_2$ up to an end of a vehicle body of the relative vehicle Vr which is perpendicular to a length direction of the self vehicle in relation to the collision location, and width information of the self vehicle, as illustrated in FIG. 2. $X_1$ is a width of the self vehicle which overlaps the relative vehicle in relation to the collision location. $X_1$ and $X_2$ may be calculated using the collision location, the collision angle, and the size (the length and the width) of the relative vehicle.

The processor 150 compares the first time $t_1$ and the second time $t_2$ which are calculated according to the Equations 1 and 2 above, and determines a braking point of time (a braking application point of time) and required braking force depending on the result of the comparison. Here, the required braking force may be categorized as either full braking or partial braking.

If a value ($t_2-t_1$) obtained by subtracting the first time $t_1$ from the second time $t_2$ is 0 or more, the processor 150 controls a brake (not illustrated) to perform the full braking. In other words, if the second time $t_2$ is the first time $t_1$ or more, the processor 150 performs the full braking because the collision avoidance time by the full braking of the self vehicle is shorter than a time it would take for the relative vehicle to pass the point of impact.

The processor 150 calculates the braking application point of time (hereinafter, referred to as the braking point of time) at which the full braking is applied. The processor 150 calculates a last point to brake time to intersection (LPB TTIs) using Equations 1 and 3 calculating a braking distance $R_x$ (a distance by which the vehicle is moved until the vehicle is stopped) by the full braking. In other words, the processor 150 calculates the last point to brake time to intersection (LPB TTI)

$$\frac{t_1}{2}$$

by substituting Equation 1 into Equation 3.

$$R_{x1}=v_{rx}t_1-0.5g\mu t_1^2$$ [Equation 3]

If the value ($t_2-t_1$) obtained by subtracting the first time $t_1$ from the second time $t_2$ is less than 0, the processor 150 operates a brake (not illustrated) to perform the partial braking. If the second time $t_2$ is less than the first time $t_1$, the processor 150 performs the partial braking because the time it takes for the relative vehicle to pass the collision location is shorter than the collision avoidance time by the full braking of the self vehicle.

The processor 150 calculates the braking point of time at which the partial braking is applied, using the following processes.

Here, the processor 150 calculates a current relative velocity $v'_{rx}$ using Equation 4 and Equation 5. Here, since the acceleration of gravity g and the time $t_2$ necessary to avoid the collision with the relative vehicle are known, $v'_{rx}$ is calculated.

$$v'_{rx}=v_{rx}-\mu g t_2$$ [Equation 4]

$$R_{x2}=v_{rx}t_2-0.5\mu g t_2^2$$ [Equation 5]

Here, the processor 150 may calculate partial braking deceleration a using Equation 6 and Equation 7. Here, a is calculated using $v'_{rx}$ and $R_{x1}$ calculated above.

$$v'_{rx}=v_{rx}-\mu a t_2$$ [Equation 6]

$$R_{x1}=v_{rx}t_3-0.5\mu a t_3^2$$ [Equation 7]

As such, the processor 150 calculates the braking point of time $$\frac{t_1}{2}$$

at which the full braking or the partial braking is applied. Here, the reason that the points of time at which the full braking and the partial braking are applied are equal to each other is to inform the driver about the collision risk through the partial braking and allow the braking to be performed by a determination of the driver, in readiness for a case in which the relative vehicle takes more time to pass through the collision location because information on the length or the width of the relative vehicle is not accurate.

In addition, the processor 150 performs the partial braking, and ascertains whether or not the braking is performed by a user. The processor 150 ascertains whether the user presses down on the brake pedal.

If the braking by the user is performed, the processor 150 assists in the braking so that the full braking may be performed. For example, if the user presses down the pedal of the brake while performing the partial braking, the processor 150 allows the user to perform the full braking using a braking assistance.

If the user does not perform any braking, however, the processor 150 again compares the first time $t_1$ and the second time $t_2$, and determines a braking point of time and required braking force depending on the comparison result.

Figure 3:
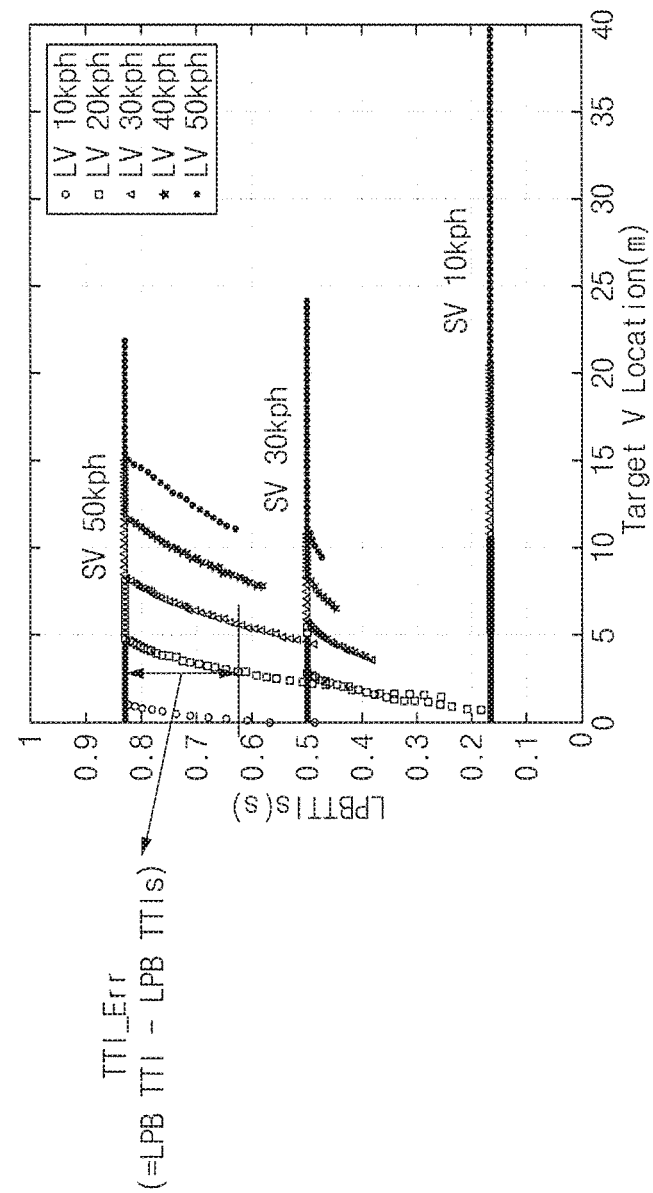
FIG. 3 is a graph illustrating a final point of time of a full braking for a collision avoidance depending on a location of a relative vehicle related to the present disclosure.

FIG. 3 is a graph illustrating a final point of time of a full braking for a collision avoidance depending on a location of a relative vehicle related to the present disclosure. This graph illustrates a time necessary to avoid the collision by the full braking of a self vehicle SV depending on a velocity of the relative vehicle LV and a velocity of the self vehicle SV.

In FIG. 3, LPB TTI is a final point of time of a full braking at which the relative velocity of the relative vehicle becomes 0 kph until the relative vehicle enters an intersection, and LPB TTIs is a final point of time at which the self vehicle needs to apply the full braking to avoid the collision with the relative vehicle, and occurs in a region in which the relative velocity is not 0 kph. TTI_Err is error between LPB TTI and LPB TTIs, and as TTI_Err is increased, the required braking force is decreased.

FIGS. 4 to 7 are diagrams illustrating an autonomous emergency braking according to the present disclosure.

Figure 4:
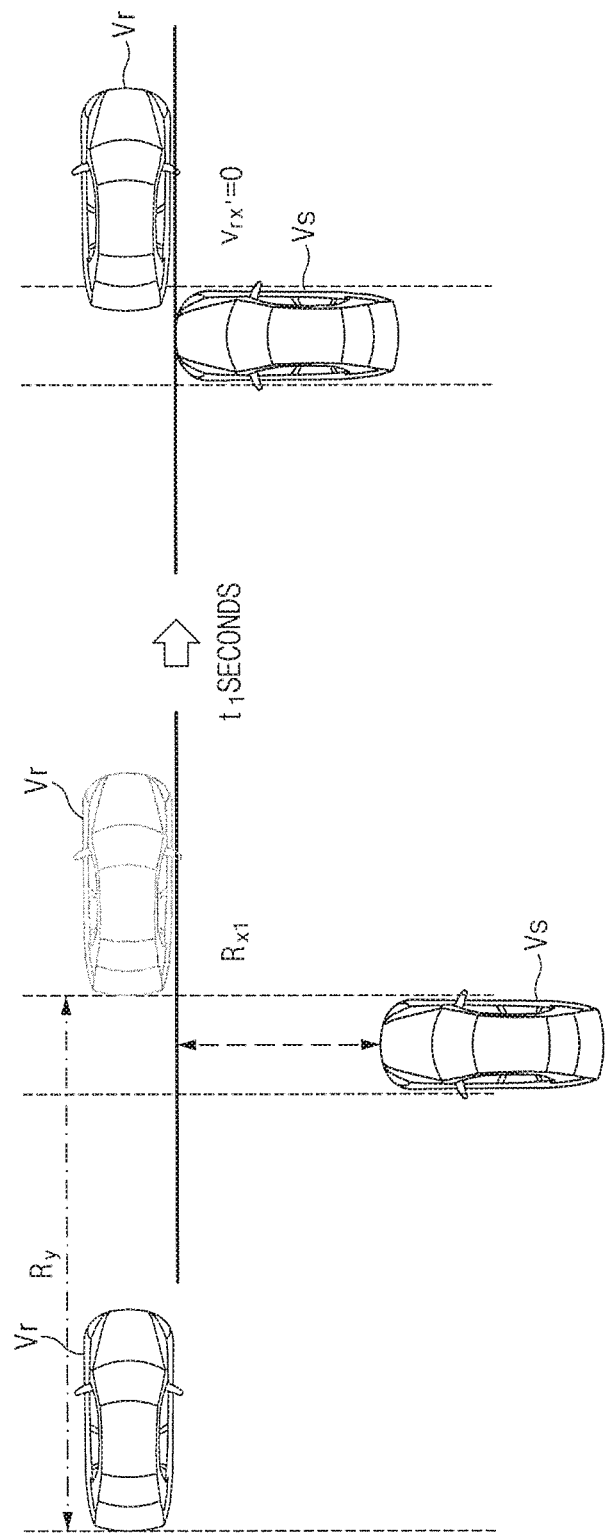
FIGS. 4 to 7 are diagrams illustrating an autonomous emergency braking according to the present disclosure.
Figure 5:
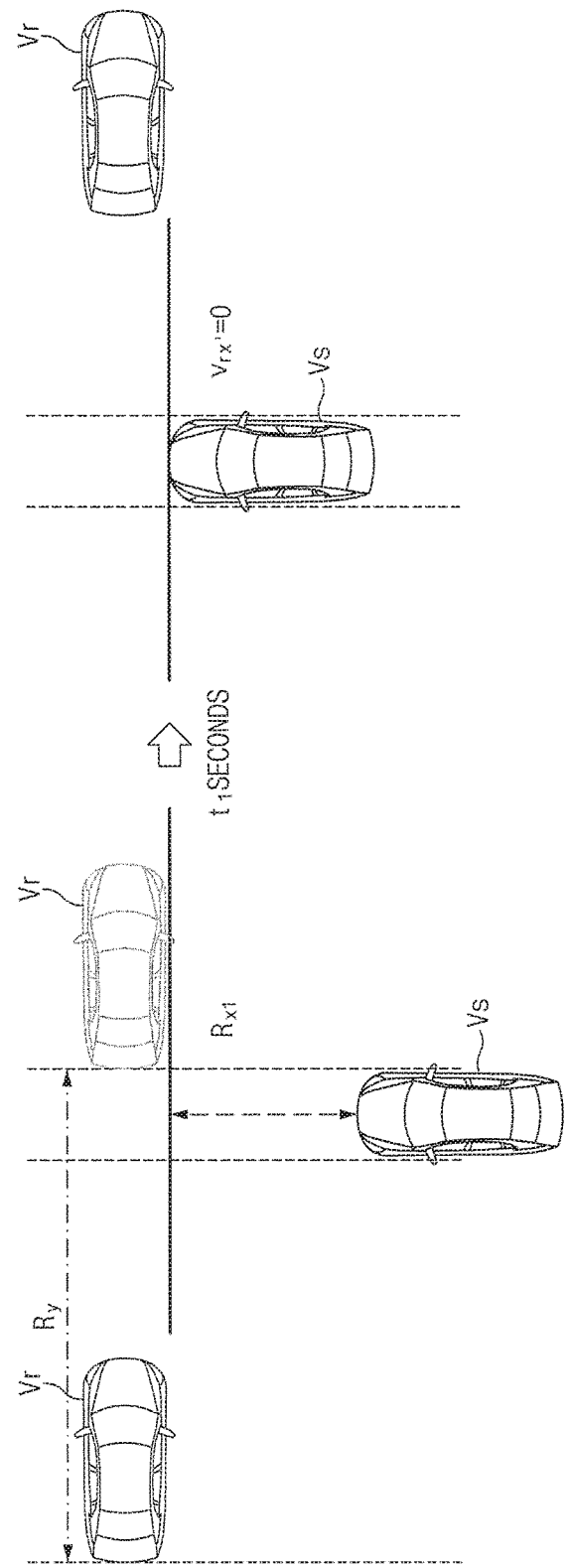

Referring to FIGS. 4 and 5, a distance necessary for the relative vehicle Vr to avoid the collision is $R_y$, and the relative vehicle Vr takes a time of $t_2$ to pass the distance $R_y$. In addition, a stop distance that the self vehicle Vs is moved until it is stopped by the full braking is $R_{x1}$, and a time taken when the self vehicle Vs moves as much as the stop distance is $t_1$.

When $t_2 \geq t_1$, the self vehicle Vs performs the full braking during the time of $t_1$ and stops before it enters the intersection. In this case, as illustrated in FIG. 4, after the self vehicle Vs stops before it enters the intersection, the relative vehicle Vr passes across the path of the self vehicle Vs.

When $t_2 < t_1$, the time taken for the relative vehicle Vr to pass across the path of the self vehicle Vs, that is, the relative vehicle will cross the intersection before the self vehicle Vs is stopped before entering the intersection, the processor 150 defers the braking point of time or applies the partial braking, thereby making it possible to avoid the collision.

Figure 6:
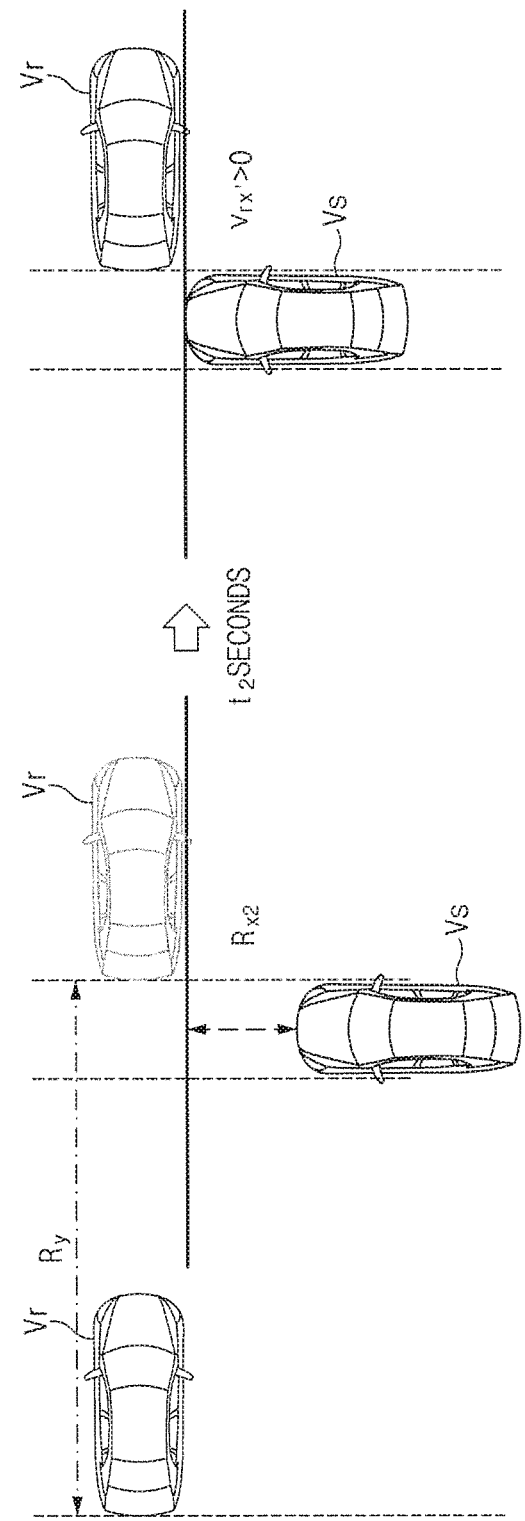

Referring to FIG. 6, $t_2$ is the time taken for the relative vehicle to pass the distance $R_y$ necessary to avoid the collision, and $t_2$ is a time taken when the self vehicle Vs moves a collision avoidable distance $R_{x2}$ by the full braking. Here, in the case in which the collision avoidable distance $R_{x2}$ by the full braking of the self vehicle Vs is smaller than the distance $R_{x1}$ that the self vehicle Vs is moved until it is stopped by the full braking, and $t_2 < t_1$, when it is assumed that information of the sensor is accurate, since the braking point of time is deferred and a braking control is performed, displeasure of the braking of the driver may be minimized.

Figure 7:
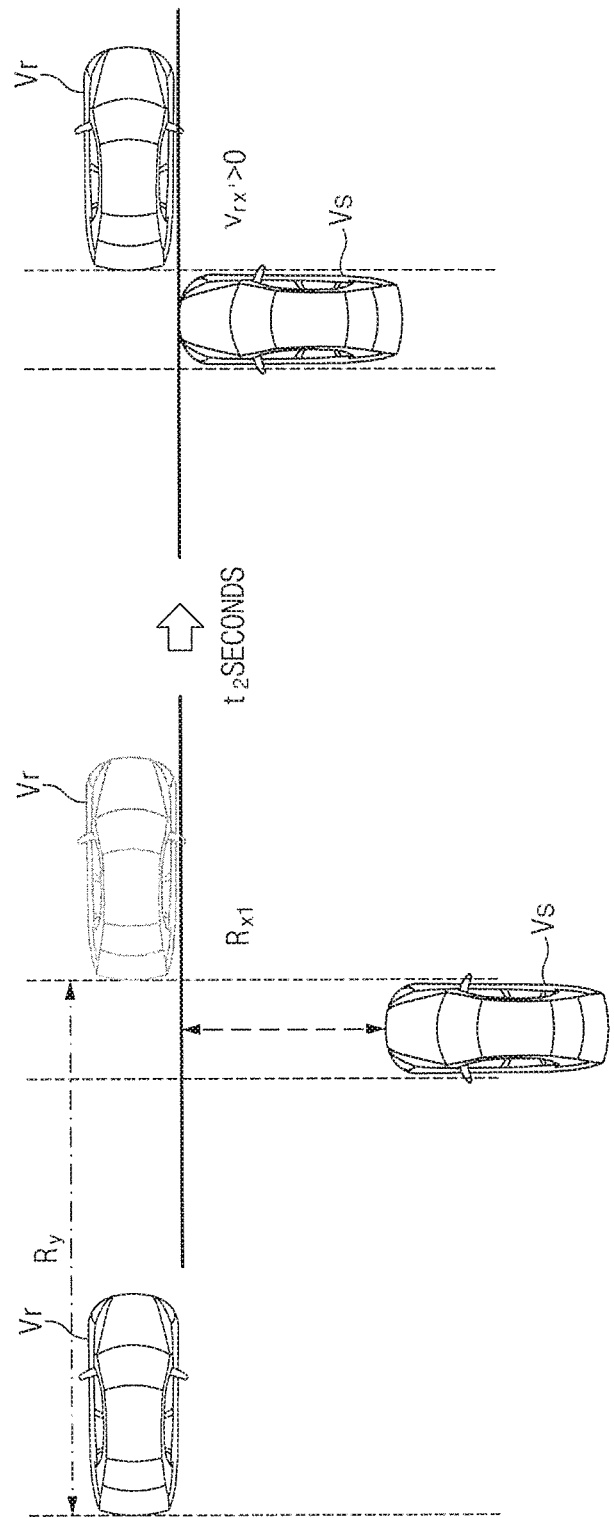

Referring to FIG. 7, when $t_2 < t_1$, since the time $t_2$ taken when the relative vehicle Vr passes the intersection is short, the self vehicle Vs may avoid the collision using only the partial braking. In this case, the collision risk may be highlighted to the driver by a fast braking, and the collision risk due to a limit of the sensor may be decreased by intervention of the driver.

Figure 8:
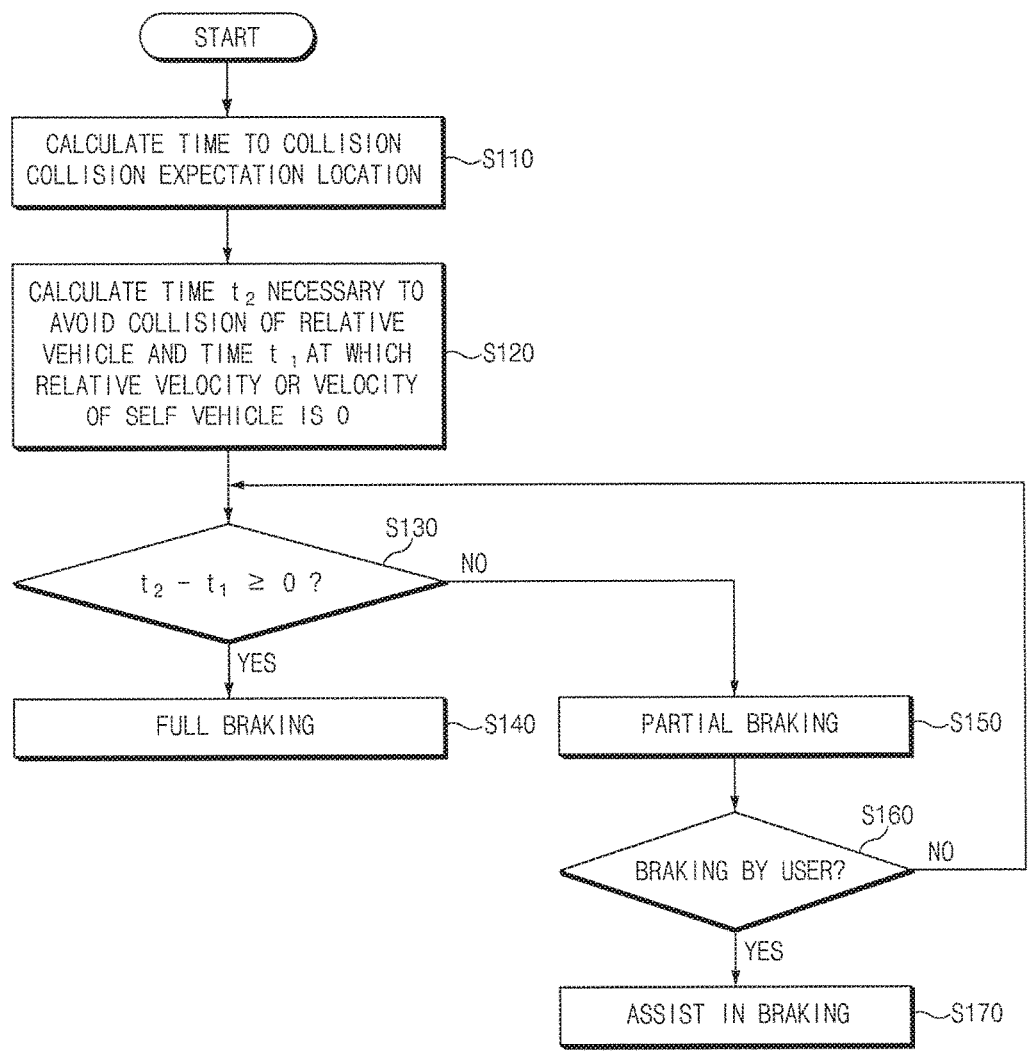
FIG. 8 is a flowchart illustrating an autonomous emergency braking method according to an exemplary embodiment of the present disclosure.

FIG. 8 is a flowchart illustrating an autonomous emergency braking method according to an exemplary embodiment in the present disclosure.

The processor 150 of the autonomous emergency braking apparatus calculates collision estimation information using relative vehicle information and self vehicle information collected by the relative vehicle information collector 110 and the self vehicle information collector 120 when the vehicles approach the intersection (S110). Here, the collision estimation information includes a collision expectation location, a time to collision (TTC), a collision angle, and the like.

The processor 150 calculates a first time $t_1$ at which the relative velocity or the velocity of the self vehicle is 0 kph, and the second time $t_2$ necessary for the relative vehicle to avoid the collision, based on the calculated collision estimation information (S120).

The processor 150 compares the first time $t_1$ and the second time $t_2$ (S130).

When the second time $t_2$ is greater than or equal to the first time $t_1$, the processor 150 controls a brake (not illustrated) to perform a full braking (S140).

When the second time $t_2$ is less than the first time $t_1$, however, the processor 150 controls the brake (not illustrated) to perform a partial braking (S150).

When the processor 150 performs the partial braking, the processor 150 ascertains whether or not the braking is performed by the user (S160). For example, the processor 150 ascertains whether or not the user manipulates a pedal of the brake.

If the user performs the braking, the processor 150 assists in the braking so that the full braking may be performed (S170). That is, if the user manipulates the pedal of the brake, the processor 150 senses the manipulation of the pedal of the brake and assists in the braking so that the full braking may be performed.

Otherwise, the user does not perform the braking in S160. In this case, the processor 150 monitors the second time $t_2$ necessary for the relative vehicle to avoid the collision and the first time $t_1$ at which the relative velocity or the velocity of the self vehicle is 0 kph (S130).

Although it has been mentioned that all components configuring the exemplary embodiment of the present disclosure described above are combined with each other as one component or are combined and operated with each other as one component, the present disclosure is not necessarily limited to the above-mentioned exemplary embodiment. That is, all the components may also be selectively combined and operated with each other as one or more components without departing from the scope of the present disclosure. In addition, although each of all the components may be implemented by one independent hardware, some or all of the respective components which are selectively combined with each other may also be implemented by a computer program having a program module performing some or all of functions combined with each other in one or plural hardware. Codes and code segments configuring the computer program may be easily deduced by those skilled in the art. The computer program as described above may be stored in computer readable media, and be read and executed by a computer to implement the exemplary embodiments of the present disclosure.

As described above, according to the exemplary embodiments of the present disclosure, since the collision point of time with other vehicle having different advancing direction from a self vehicle is estimated to control the braking of the vehicle, the collision with other vehicle may be avoided, or when the self vehicle collides with other vehicle, an impact amount may be minimized.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An autonomous emergency braking apparatus comprising:
    a relative vehicle information collector configured to collect relative vehicle information using a variety of sensors in a vehicle;
    a self vehicle information collector configured to collect self vehicle information using the sensors mounted in the vehicle; and
    a processor configured to calculate and compare a first time for a collision avoidance of the self vehicle and a second time for a collision avoidance of the relative vehicle based on the relative vehicle information and the self vehicle information, and determine a braking point of time and required braking force depending on the comparison result,
    wherein when the second time is the first time or more, the processor performs a full braking, and
    wherein when the second time is less than the first time, the processor performs a partial braking.

2. The autonomous emergency braking apparatus according to claim 1, wherein the relative vehicle information includes longitudinal velocity and lateral velocity of the relative vehicle, an advancing direction of the relative vehicle, a relative location of the relative vehicle, and a width and a length of the relative vehicle.

3. The autonomous emergency braking apparatus according to claim 1, wherein the self vehicle information includes velocity of the self vehicle, an advancing direction of the self vehicle, and a width and a length of the self vehicle.

4. The autonomous emergency braking apparatus according to claim 1, wherein the processor calculates a collision location, a collision angle, and a time to collision based on the relative vehicle information and the self vehicle information.

5. The autonomous emergency braking apparatus according to claim 1, wherein the first time is a time taken until a relative velocity of the relative vehicle or a velocity of the self vehicle becomes 0 kph.

6. The autonomous emergency braking apparatus according to claim 1, wherein the second time is a time necessary for the relative vehicle to avoid a collision with the self vehicle.

7. The autonomous emergency braking apparatus according to claim 1, wherein when a braking is performed by a user at the time of the partial braking, the processor assists in the braking so that the full braking is performed.

8. An autonomous emergency braking method comprising:
    collecting relative vehicle information to calculate collision estimation information;
    calculating a first time for a collision avoidance of a self vehicle and a second time for a collision avoidance of a relative vehicle based on the collision estimation information;
    comparing the first time and the second time; and
    determining a braking point of time and required braking force depending on the comparison result of the first time and the second time,
    wherein in the determining of the braking point of time and the required braking force, when the second time is the first time or more, the brake is controlled to perform a full braking, and
    wherein in the determining of the braking point of time and the required braking force, when the second time is less than the first time, the brake is controlled to perform a partial braking.

9. The autonomous emergency braking method according to claim 8, wherein in the determining of the braking point of time and the required braking force, when a braking is performed by a user while the partial braking is performed, a braking assistance is performed so that the full braking is implemented.

10. The autonomous emergency braking method according to claim 8, wherein the braking point of time is ½ of the first time.

* * * * *